US008832291B2

(12) United States Patent
Kurihara et al.

(10) Patent No.: US 8,832,291 B2
(45) Date of Patent: Sep. 9, 2014

(54) BROADCAST TRANSPORT STREAM DISTRIBUTION SYSTEM, AND BROADCAST TRANSPORT STREAM DISTRIBUTION APPARATUS, USER TERMINAL DEVICE AND DISTRIBUTION METHOD FOR USE IN THE SYSTEM

(75) Inventors: Shinichi Kurihara, Yokohama (JP); Yoshiro Osaki, Kawasaki (JP); Sunao Wada, Yokohama (JP); Hiroaki Fukui, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 546 days.

(21) Appl. No.: 11/939,127

(22) Filed: Nov. 13, 2007

(65) Prior Publication Data
US 2008/0114890 A1 May 15, 2008

(30) Foreign Application Priority Data

Nov. 14, 2006 (JP) ................. 2006-308251

(51) Int. Cl.
*G06F 15/16* (2006.01)
(52) U.S. Cl.
USPC .......................................... 709/231; 709/232
(58) Field of Classification Search
USPC .......................................................... 709/231
See application file for complete search history.

(56) References Cited

U.S. PATENT DOCUMENTS

| 6,600,870 | B1 * | 7/2003 | Okamoto et al. ............. 386/328 |
| 7,310,678 | B2 * | 12/2007 | Gunaseelan et al. .......... 709/230 |
| 2002/0003799 | A1 * | 1/2002 | Tomita .......................... 370/392 |
| 2002/0097750 | A1 * | 7/2002 | Gunaseelan et al. .......... 370/503 |
| 2003/0074554 | A1 * | 4/2003 | Roach et al. ................... 713/153 |
| 2003/0233464 | A1 * | 12/2003 | Walpole et al. ................ 709/231 |
| 2004/0008736 | A1 | 1/2004 | Bae et al. |
| 2004/0181810 | A1 * | 9/2004 | Pelkey et al. .................. 725/116 |
| 2004/0218633 | A1 * | 11/2004 | Burzynski ...................... 370/474 |
| 2005/0005020 | A1 * | 1/2005 | Rey et al. ....................... 709/231 |
| 2005/0286496 | A1 * | 12/2005 | Malhotra et al. .............. 370/352 |

(Continued)

FOREIGN PATENT DOCUMENTS

| CN | 1977517 A | 6/2007 |
| EP | 0 624 983 A2 | 11/1994 |
| EP | 1 883 247 A2 | 1/2008 |
| WO | WO 00/44175 | 7/2000 |

OTHER PUBLICATIONS

U.S. Appl. No. 12/041,135, filed Mar. 3, 2008, Osaki.
U.S. Appl. No. 12/049,081, filed Mar. 14, 2008, Kimiyama.
U.S. Appl. No. 11/892,679, filed Aug. 27, 2007, Yoshiro Osaki.
Office Action issued on Oct. 18, 2013 in the corresponding Chinese Application No. 201210277300.5 (with English Translation).

*Primary Examiner* — Hamza Algibhah
*Assistant Examiner* — James Edwards
(74) *Attorney, Agent, or Firm* — Oblon, Spivak, McClelland, Maier & Neustadt, L.L.P.

(57) ABSTRACT

In a transport stream distribution system, a transmission rate control unit takes in an IP packet output from an IP transmission processing unit, obtains a TTS to be added to an arbitrary TS packet in the IP packet, and compares the TTS with a time stamp generated internally to determine whether both of them coincide with each other or not. And if they coincide with each other, the system takes in a TTS of the next TS packet, and otherwise, the system obtains a difference between a time indicating the TTS and the time indicating the internally generated time stamp to calculate a transmission rate correction value equivalent to the value of the difference, and issues the calculated correction value to the processing unit to correct a transmission rate.

10 Claims, 4 Drawing Sheets

(56) References Cited

U.S. PATENT DOCUMENTS

| | | |
|---|---|---|
| 2007/0076764 A1* | 4/2007 | Kawada et al. ............... 370/503 |
| 2007/0081558 A1* | 4/2007 | Shaikli ......................... 370/474 |
| 2007/0115832 A1* | 5/2007 | Ramalho ....................... 370/241 |
| 2007/0143493 A1* | 6/2007 | Mullig et al. ................. 709/232 |
| 2007/0217400 A1* | 9/2007 | Staples ......................... 370/356 |
| 2008/0137685 A1* | 6/2008 | Gunaseelan et al. .......... 370/468 |
| 2009/0271512 A1* | 10/2009 | Jorgensen ..................... 709/224 |

* cited by examiner

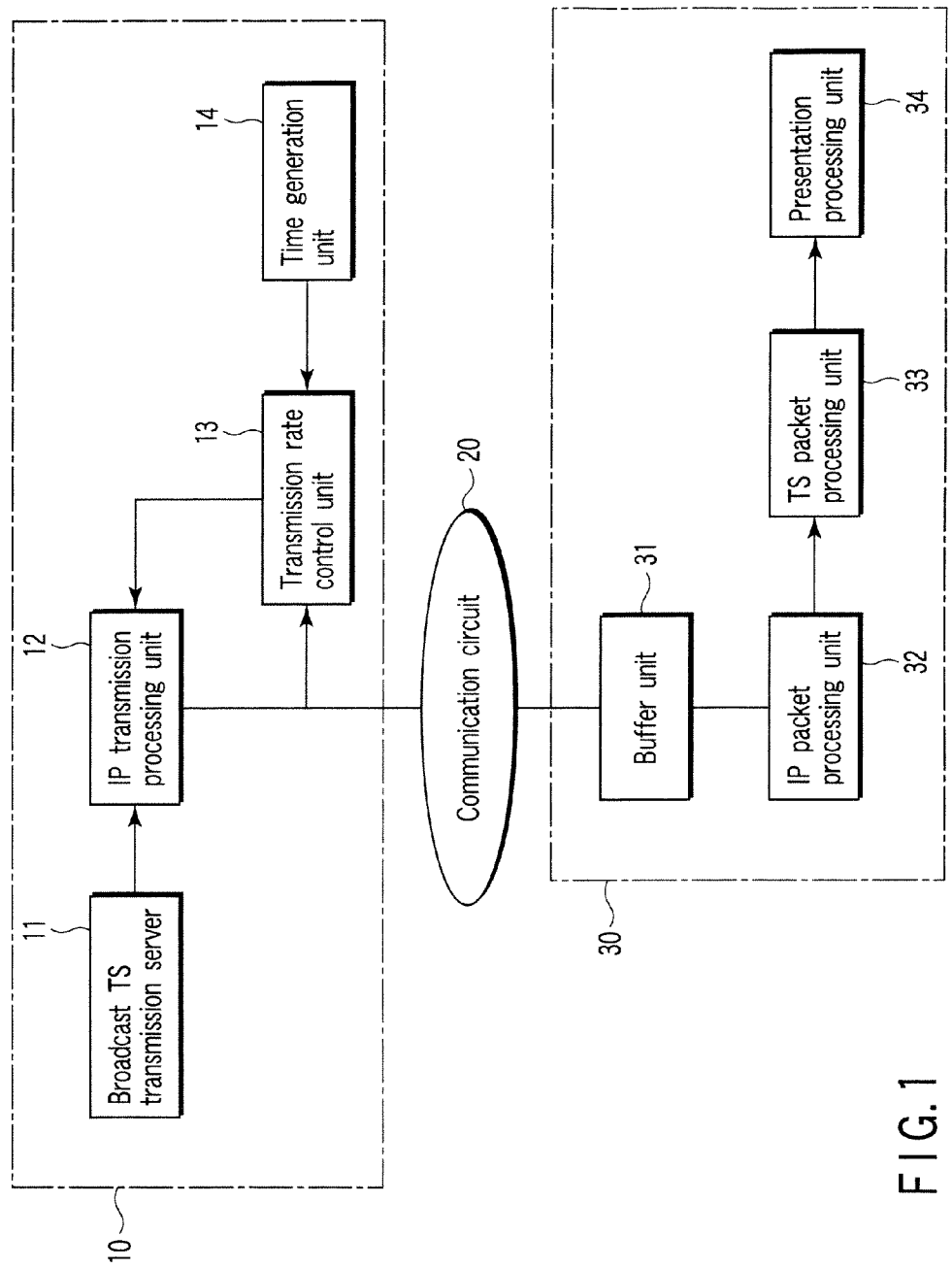
F I G. 1

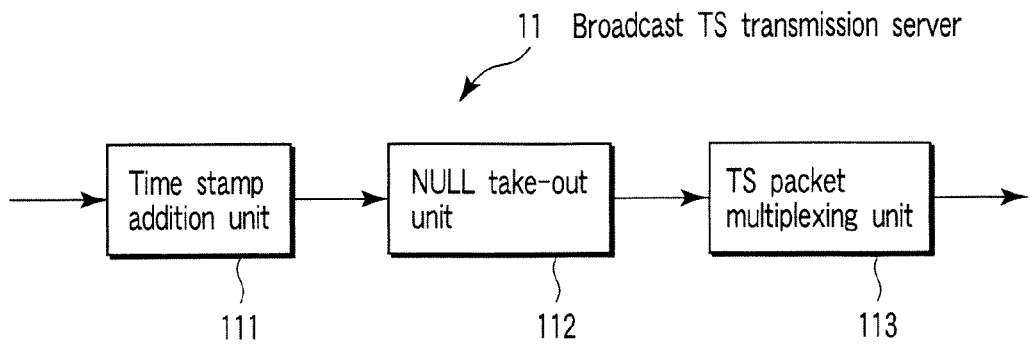
F I G. 2
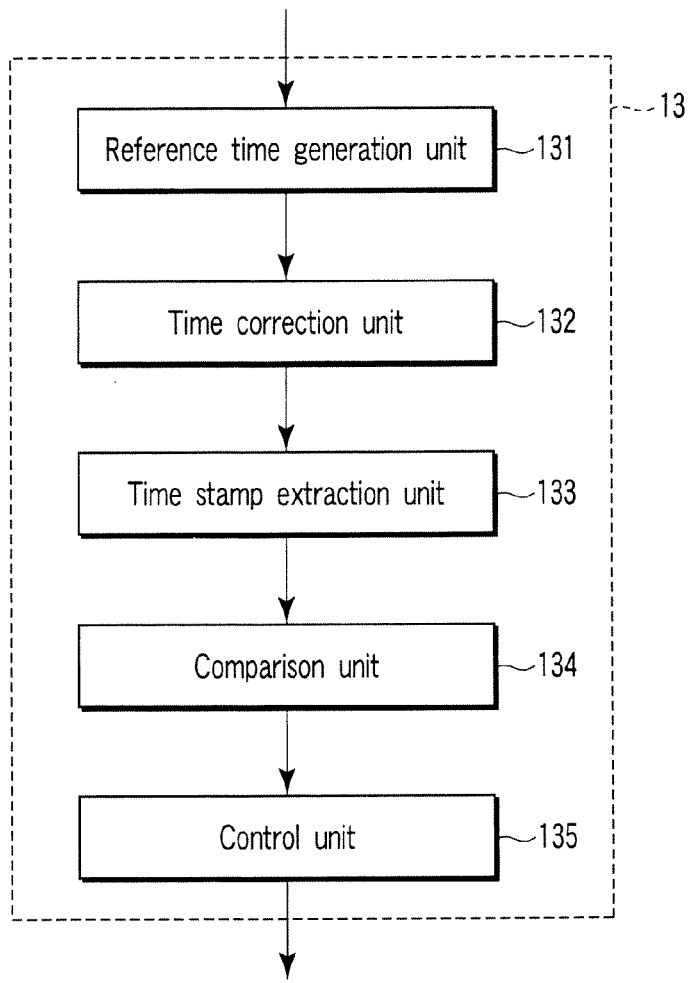
F I G. 3

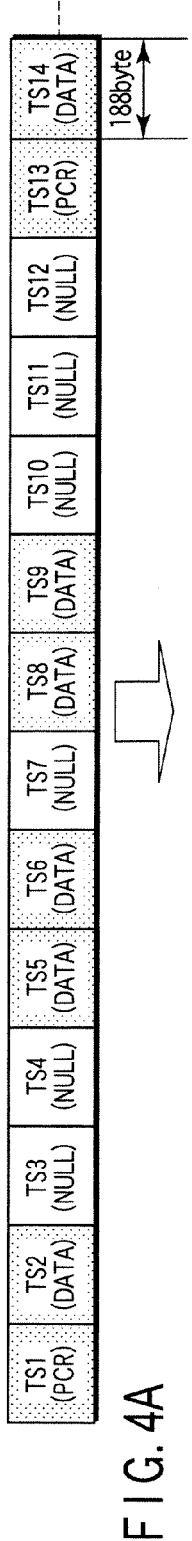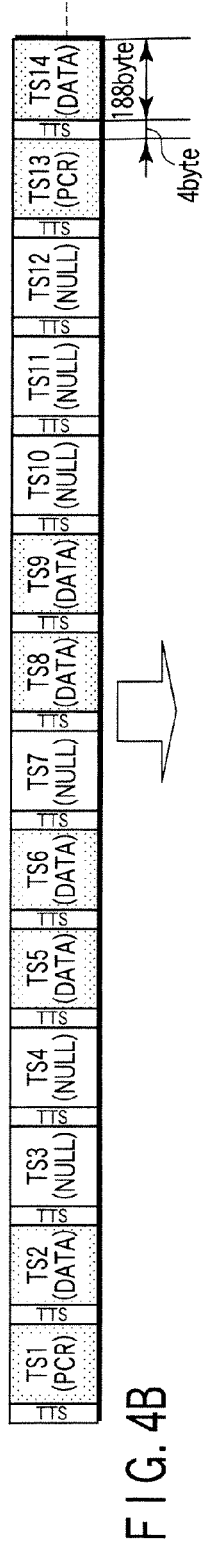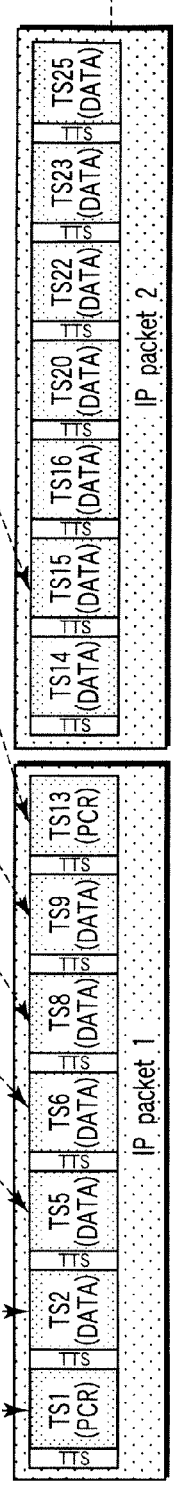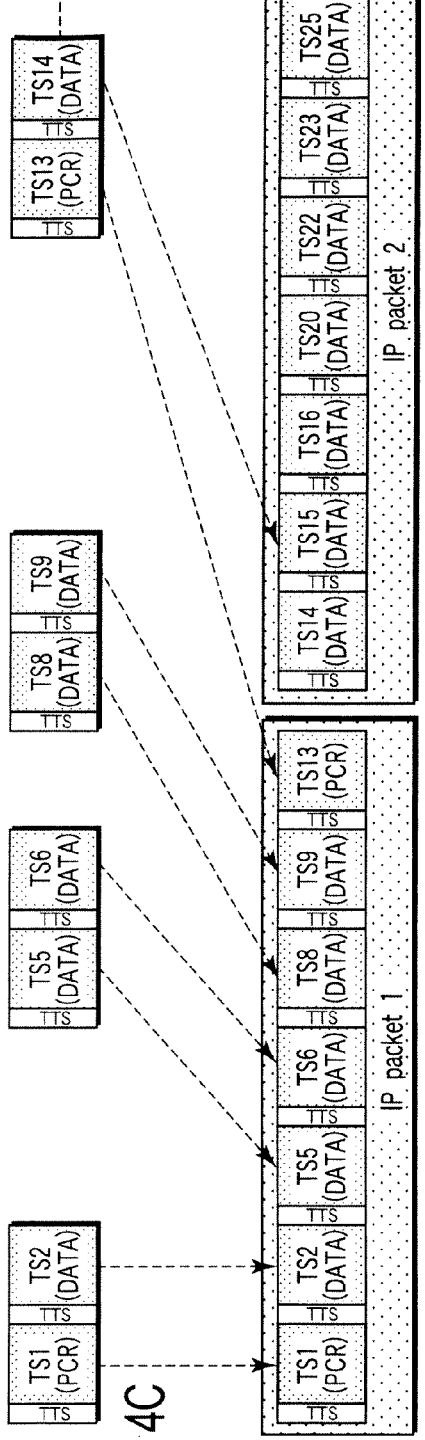
F I G. 4A
F I G. 4B
F I G. 4C
F I G. 4D

BROADCAST TRANSPORT STREAM DISTRIBUTION SYSTEM, AND BROADCAST TRANSPORT STREAM DISTRIBUTION APPARATUS, USER TERMINAL DEVICE AND DISTRIBUTION METHOD FOR USE IN THE SYSTEM

CROSS-REFERENCE TO RELATED APPLICATIONS

This application is based upon and claims the benefit of priority from prior Japanese Patent Application No. 2006-308251, filed Nov. 14, 2006, the entire contents of which are incorporated herein by reference.

BACKGROUND OF THE INVENTION

1. Field of the Invention

The present invention relates to a broadcast transport stream (hereinafter, referred to as a TS) distribution system which packetizes TSs of broadcast program contents and distributes them via a communication line through an Internet Protocol (IP) network.

2. Description of the Related Art

Recently, a video on demand (hereinafter, referred to as a VOD) service has become widely available through IP broadcasting by using a communication line through the IP network, which has resulted from the widespread use of broadband. Some of such services to distribute TS packets, which have been used in terrestrial digital broadcasting, etc., have begun to be offered by the use of such communication lines. In such a service, there is a need to suppress transmission rates as much as possible. Therefore, a technique which reduces the total amount of transmission data and intends to decrease the transmission rates by discarding unnecessary packets is disclosed (refer to, e.g., Jpn. Pat. Appln. No. 2006-151527).

Meanwhile, a user terminal device to receive TS packets which are IP-packetized by using the communication line obtains data by securing a buffer area so as to absorb the delay on the communication line and the irregularity (fluctuation) of data arrival times, and obtains data. However, the size of the buffer area is set on the premise that a distribution apparatus transmits the IP-packetized TS packets at a constant rate. Therefore, if subtle deviations in transmission rates of the distribution apparatus occur, and if the user terminal device continues to receive the IP-packetized TS packets for a long time, the 'deviations' results in accumulation, and there is the possibility of an occurrence of underflow or overflow of the buffer area. In the case of an underflow, the user terminal device generates blackout on a presentation, and in the case of an overflow, the overflow results in an increase in the delay because the size of the buffer area is large, or an occurrence of a video jump so as to correct the delay.

As regards such a problem, compensation by notifying information for adjusting the transmission rates to the distribution apparatus from the user terminal device in the use of an interactive protocol such as a real-time transport protocol control protocol (RTCP) is a possible approach. However, in broadcast-distribution of broadcast content, responding to requests from all user terminal devices poses a large load on a server on a distribution-side, so that it is not a realistic response to respond to a huge number of users.

As given above, in the case of distribution of the broadcast TSs by converting them into the IP packets, subtle deviations in the transmission rates are accumulated in the buffer area on the user terminal device-side, and this results in a risk of underflow or overflow in the buffer.

BRIEF SUMMARY OF THE INVENTION

An object of the present invention is to provide a broadcast TS distribution system configured to correct deviations in transmission rates in distributing broadcast TSs converted into IP packets and to reduce the influence on a buffer area on a user terminal device-side, and a broadcast TS distribution apparatus, a user terminal device and a distribution method for use in the system.

A broadcast TS distribution system regarding the invention is a broadcast transport stream distribution system, comprising: a distribution apparatus which distributes broadcast transport streams in which transport streams of broadcast program contents are packetized via a communication line through an Internet Protocol network; and a user terminal device which receives the broadcast transport streams to be distributed from the distribution apparatus via the communication line, wherein the distribution apparatus includes: a partial transport stream generation unit which counts standard clocks to generate time stamps and adds the time stamps in turn to each of the packets of the broadcast transport streams to generate partial transport streams; an Internet Protocol transmission processing unit which converts the partial transport streams into Internet Protocol packets to transmit them; and an Internet Protocol transmission rate control unit which extracts a time stamp of an arbitrary packet from the partial transport streams output from the Internet Protocol transmission processing unit, compares the extracted time stamp with a reference time, and controls a transmission rate of the Internet Protocol transmission unit so that both the extracted time stamp and the reference clock coincide with each other on the basis of the comparison result, and the user terminal device includes: a buffer which temporarily stores the Internet Protocol packets to be transmitted via the communication line; an Internet Protocol packet processing unit which takes out the Internet Protocol packets from the buffer in turn to extract the partial transport streams; and a broadcast transport stream reproduction unit which reproduces the broadcast transport streams by extracting time stamps from each of the Internet Protocol packets of the partial transport streams extracted by the Internet Protocol packet processing unit and by re-arranging the Internet Protocol packets on a time axis on the basis of the corresponding-time stamps.

A broadcast TS distribution apparatus regarding the invention is a broadcast transport stream distribution apparatus which distributes broadcast transport streams, in which transport streams of broadcast program contents are packetized, to a user terminal device via a communication line through an Internet Protocol network, the apparatus comprising: a partial transport stream generation unit which counts standard clocks to generate time stamps, and adds the time stamps in turn to each of the packets of the broadcast transport streams to generate partial transport streams; an Internet Protocol transmission processing unit which converts the partial transport streams into Internet Protocol packets to transmit them; a time stamp extraction unit which extracts a time stamp of an arbitrary packet from the partial transport streams output from the Internet Protocol transmission processing unit; a comparison unit which compares the extracted time stamp with a reference time; and a control unit which controls a transmission rate of the Internet Protocol transmission processing unit so that both the extracted time stamp and the reference time coincide with each other on the basis of the comparison result from the comparison unit.

A user terminal device of a broadcast TS distribution system regarding the invention is a user terminal device for use in a broadcast transport stream distribution system which distributes broadcast transport streams in which transport streams of broadcast program contents are packetized from a distribution apparatus via a communication line through an Internet Protocol network, the device comprising: when the distribution apparatus counts standard clocks to generate time stamps, adding the time stamps in turn to each of the packets of the broadcast transport streams to generate partial transport streams, converts the partial transport streams into Internet Protocol packets to transmit them, extracts a time stamp of an arbitrary packet from the partial transport streams which are converted into the Internet Protocol packets to be transmitted, compares the extracted time stamp with a reference clock, and controls transmission rates of the Internet Protocol packets so that both the extracted time stamp and the reference time coincide with each other, a buffer which temporarily stores the Internet Protocol packets to be transmitted via the communication line; an Internet Protocol packet processing unit which takes out the Internet Protocol packets from the buffer in turn to extract the partial transport streams; and a broadcast transport stream reproduction unit which reproduces the broadcast transport streams by extracting time stamps from each of the Internet Protocol packets of the partial transport streams extracted by the Internet Protocol packet processing unit and by re-arranging the Internet Protocol packets on a time axis on the basis of the corresponding-time stamps.

A broadcast TS distribution method regarding the invention is a broadcast transport stream distribution method for use in a broadcast transport stream distribution system which distributes broadcast transport streams, in which transport streams of broadcast program contents are packetized, to a user terminal device via a communication line through an Internet Protocol network, the method comprising: counting standard clocks to generate time stamps; adding in turn the time stamps to each of the packets of the broadcast transport streams to generate partial transport streams; converting the partial transport streams into Internet Protocol packets to transmit them; extracting a time stamp of an arbitrary packet from the partial transport streams to be converted into the Internet Protocol packets to be transmitted; and comparing the extracted time stamp with a reference time to control transmission rates of the Internet Protocol packets so that both the extracted time stamp and the reference time coincide on the basis of the comparison result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an embodiment of a broadcast TS distribution system regarding the present invention;

FIG. 2 is a block diagram showing a concrete configuration of a broadcast TS transmission server of the system shown in FIG. 1;

FIG. 3 is a view showing each of the format structures of an input broadcast TS, a broadcast TS with a four-byte time stamp (TTS), a broadcast TS without NULL and an IP-packetized broadcast TS for use in the system shown in FIG. 1;

FIGS. 4A, 4B, 4C and 4D are block diagrams showing concrete configurations of transmission rate control units to be used in the system shown in FIG. 1.

DETAILED DESCRIPTION OF THE INVENTION

Figure 5:
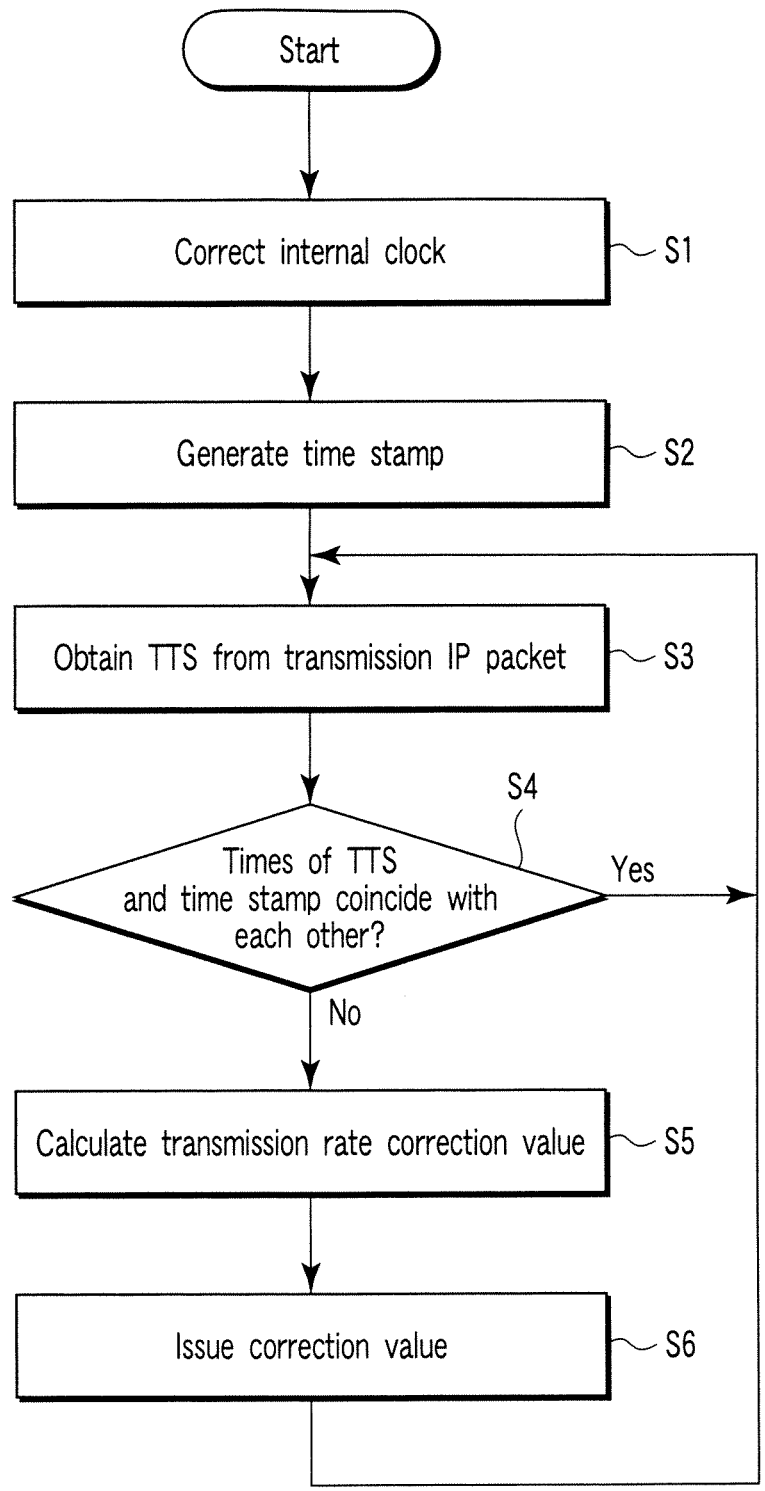
FIG. 5 is a flowchart showing a flow of processing of the transmission rate control unit to be used in the system shown in FIG. 1.

Hereinafter, embodiments of the present invention will be described in detail with reference to the drawings.

FIG. 1 illustrates a block diagram depicting an embodiment of a broadcast TS distribution system regarding the invention. In FIG. 1, the distribution system includes a broadcast TS distribution apparatus 10, a communication line through an IP network 20 and a user terminal device 30 to be connected with the communication line 20.

In the distribution apparatus 10, a broadcast TS system in which TS-packetized broadcast program content is supplied to a broadcast TS transmission server 11. The server 11 is configured as depicted in FIG. 2. The broadcast TS system which is input to the server 11 is supplied to a time stamp addition unit 111. The addition unit 111 counts standard clocks based on a current time to generate time stamps, and adds the time stamps as arrival times for each of the time stamps to be input. A NULL take-out unit 112 takes out NULL packets in the TS of the broadcast TS system to which the TSs are added in such a manner. The broadcast TS system after the take-out of the NULL packets is supplied to a TS packet multiplexing unit 113 to be multiplexed with parameters and additional information for reception demodulation and the multiplexed broadcast TS system is supplied to an IP transmission processing unit 12.

The transmission processing unit 12 IP-packetizes the TS packets in the broadcast TS system from which the NULL packets are taken out by storing the TS packets in payloads in turn by defined number. The broadcast TS system with the TTS which is IP-packetized (hereinafter, referred to as IP packet system) is distributed to a prescribed user terminal device 30 through the communication line 20.

Here, the IP packet system to be transmitted from the transmission processing unit 12 is taken into a transmission rate control unit 13. The control unit 13 includes, as shown in FIG. 3, a reference time generation unit 131 which generates reference times equivalent to the foregoing time stamp by generating and counting reference clocks equivalent to the standard clocks; a time correction unit 132 which corrects the reference times on the basis of the times from a time generation unit 14 (refer to FIG. 1) to generate accurate times of a millisecond order; a time stamp extraction unit 133 which extracts the time stamps of an arbitrary TS packet from among IP packets output from the transmission processing unit 12; a comparison unit 134 which compares the extracted time stamp and the reference time with each other; and a control unit 135 which controls the transmission rate of the transmission processing unit 12 so that both the extracted TS and reference time coincide on the basis of the comparison result from the comparison result.

On the other hand, in the user terminal device 30, the IP packet system received via the communication line 20 is stored in a buffer unit 31 once, and read at a defined rate to be transmitted to an IP packet processing unit. The packet processing unit 32 takes out the TS packets in turn from each of the IP packets in the input IP packet system, and the taken out TS packets are transmitted to a TS packet processing unit 33. The packet processing unit 33 decodes the time stamps from the input TS packets, re-arranges each of the time stamp packets on a time axis on the basis of the times of the time stamps, and outputs each of the time stamp packets at an original rate. Thereby, the NULL packets are buried in the IP packet system, and the original broadcast TS system is recovered. Thus, the recovered broadcast TS system is transmitted to a presentation processing unit 34 to be applied with decoding reproduction in order to present the content.

The following will describe concrete processing contents according to the given configuration.

In the case of transmission of the broadcast TS system by using a communication line, it is needed to reduce the load on the communication line. Therefore, in the embodiment of the invention, after adding a four-byte time stamp (hereinafter, referred to as a TTS) to a TS packet of which the one packet is formed of a 204-byte (with parity check), or of a 188-byte (without parity check) in the broadcast TS transmission server 11, the server 11 eliminates packets such as NULLs unnecessary for a service and transmits the TS packets. Here, the TS with the TTS added thereto is generally called a partial TS. It is assumed that the TTS is generated through a clock of 27 MHz. FIG. 4A illustrates an example of a broadcast TS system to be transmitted (in the case that one TS packet is formed of 188-byte, 29.958297 Mbps), and FIG. 4B illustrates an example of a broadcast TS system with the TTS added thereto (in the case that TTS is formed of four-byte). The broadcast TS system with TTS and without NULL generated like this is formed as shown in FIG. 4C to be transmitted to the IP transmission processing unit 12, and as shown in FIG. 4D, the broadcast TS system is IP-packetized, for example, by storing in turn seven TS packets of the broadcast TS system into each of the payloads in an IP packet. Like this, the IP-packetized broadcast TS system with TTS (hereinafter, referred to as an IP packet system) is distributed to a prescribed user terminal device 30 via the communication line 20 at a defined bit rate lower than the transmission rate of the broadcast TS.

In the given embodiment, the transmission rate control unit 13 utilizes the foregoing TTS to determine whether or not the transmission rate of the TS packet to be transmitted through the IP-packetizing by the IP transmission processing unit 12 is appropriate, and applies fine-adjustment to the transmission rate on the basis of the determining result. The determination of the appropriateness of the rate is implemented on the basis of time of an accuracy of the millisecond order, which is generated from the time generation unit 14.

FIG. 5 illustrates a flowchart illustrating a flow of a concrete processing of the transmission rate control unit 13. In FIG. 5, at first, the control unit 13 periodically corrects inner clocks on the basis of the times generated from the time generation unit 14 (Step S1), generates a four-byte time stamp counter of 27-MHz to be matched with the system of the TTS by using the corrected clocks, and generates the same time stamps as those of the TTS system by counting the corrected clocks through the time stamp counter (Step S2).

In such a state, the control unit 13 takes in the IP packet output from the IP transmission processing unit 12 to obtain the TTS added to the arbitrary TS packet in the IP packet (Step S3), and compares the TTS with the time stamp generated internally to determine whether or not they coincide with each other (Step S4). If they coincide with each other, the processing returns to Step S3 to take in the TTS of the next TS packet. If they do not coincide with each other, the control unit 13 obtains the difference between the time indicated by the TTS and the time indicated by the internally generated time stamp to calculate the transmission rate correction value equivalent to the difference value (Step S5). More specifically, the control unit 13 calculates a correction value so as to eliminate the difference value up to the specified number of transmitted IP packets or up to the number of transmitted TS packets with TTS. The control unit 13 issues the correction value calculated like this to the IP transmission processing unit 12 to correct the transmission rate (Step S6).

According to the given processing, the distribution apparatus 10 becomes able to output the IP packets at an extremely precise fixed rate. Thereby, the user terminal device 30 enables receiving the IP-packetized TS packet via the communication line 20 stably for a long time. As a result, the increase in buffer size which is caused because of the instability of the IP packet transmission rate may be reduced, there is no need of a communication function such as an interactive protocol, and costs may be cut. Especially, in outputting the partial TS with the time stamp added thereto while taking out NULL packets from the partial TS, the stability of the transmission rates of the IP packets may be achieved, which brings about an immediate result.

While the foregoing embodiment, in which the TTS added to the arbitrary TS packet in the IP packet is extracted and is compared with the internally generated time stamp, has been described, the present invention is not limited to this embodiment. For instance, a modification may be embodied similarly, in which the IP transmission processing unit 12 keeps the time stamps which are added to any of the TS packets to be stored in the IP packets as they are or after correction, on the basis of the standard time, and stores them in headers of the IP packets, and the transmission rate control unit 13 extracts the time stamps stored in the headers of the taken out IP packets to compare them with the internally generated time stamps.

Other than this, it is our intention that the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcast transport stream distribution system, comprising:
    a distribution apparatus which distributes broadcast transport streams in which transport streams of broadcast program contents are packetized via a communication line through an Internet Protocol network; and a user terminal device which receives the broadcast transport streams to be distributed from the distribution apparatus via the communication line, wherein
the distribution apparatus includes:
a partial transport stream generation unit which counts standard clocks to generate time stamps corresponding to a transmission rate of the broadcast transport streams and which adds the time stamps in turn to the packets of the broadcast transport streams, respectively, to generate a partial transport stream;
an Internet Protocol transmission processing unit which converts the partial transport streams into Internet Protocol packets to transmit them at a predetermined rate; and
an Internet Protocol transmission rate control unit which generates reference time stamps equivalent to the time stamps respectively added to the packets of the transport streams by generating and counting reference clocks equivalent to the standard clocks, corrects the reference time stamps based on standard time, extracts in turn time stamps of arbitrary transport stream packets from the Internet Protocol packets output from the Internet Protocol transmission processing unit, compares the extracted time stamps with the reference time stamps, respectively, and, if a result of comparison indicates that any of the extracted time stamps does not coincide with a corresponding one of the reference time stamps, determines a difference between time values indicated by said any extracted time stamp and said corresponding reference time stamp, calculates a correction value of a transmission rate, which corresponds to the difference between the time values, and controls a transmission rate of the Internet Protocol transmission unit on the basis of the correction value to eliminate the difference value up to a specified number of broadcast transport streams or up to a number of transmitted Internet Protocol packets, and
the user terminal device includes:
a buffer which temporarily store the Internet Protocol packets to be transmitted via the communication line;
an Internet Protocol packet processing unit which takes out the Internet Protocol packets from the buffer in turn to extract the partial transport stream; and
a broadcast transport stream reproduction unit which reproduces the broadcast transport streams by extracting time stamps from the Internet Protocol packets of the partial transport stream extracted by the Internet Protocol packet processing unit and by re-arranging the Internet Protocol packets on a time axis on the basis of the corresponding-time stamps.

2. The system according to claim 1, wherein
the partial transport stream generation unit outputs a partial transport stream with the time stamps added thereto after taking out NULL packets from the partial transport stream.

3. The system according to claim 1, wherein
the Internet Protocol transmission processing unit stores time stamps to be added to any packet of the partial transport stream in headers of Internet Protocol packets as they are or after correction of the time stamps; and
the time stamp extraction unit extracts time stamps stored in the headers of the Internet Protocol packets.

4. A broadcast transport stream distribution apparatus which distributes broadcast transport streams, in which transport streams of broadcast program contents are packetized, to a user terminal device via a communication line through an Internet Protocol network, the apparatus comprising:
a partial transport stream generation unit which counts standard clocks to generate time stamps corresponding to a transmission rate of the transport streams, and which adds the time stamps in turn to the packets of the broadcast transport streams, respectively, to generate a partial transport stream;
a reference time stamp generation unit which generates reference time stamps equivalent to the time stamps respectively added to the packets of the broadcast transport streams by generating and counting reference clocks equivalent to the standard clocks;
an Internet Protocol transmission processing unit which converts the partial transport streams into Internet Protocol packets to transmit them;
a correction unit which corrects the reference time stamps based on standard time;
a time stamp extraction unit which extracts in turn time stamps of arbitrary transport stream packets from the Internet Protocol packets output from the Internet Protocol transmission processing unit;
a comparison unit which compares the extracted time stamps with the reference time stamps, respectively; and
a control unit which determines, if a result of comparison by the comparison unit indicates that any of the extracted time stamps does not coincide with a corresponding one of the reference time stamps, a difference between time values indicated by said any extracted time stamp and said corresponding reference time stamp, calculates a correction value of a transmission rate, which corresponds to the difference between the time values, and controls a transmission rate of the Internet Protocol transmission processing unit on the basis of the correction value to eliminate the difference value up to a specified number of broadcast transport streams or up to a number of transmitted Internet Protocol packets.

5. The apparatus according to claim 4, wherein
the partial transport stream generation unit outputs a partial transport stream with the time stamps added thereto by taking out NULL packets from the partial transport stream.

6. The apparatus according to claim 4, wherein
the Internet Protocol transmission processing unit stores the time stamps to be added to any packet of the partial transport stream in headers of Internet Protocol packets as they are or after correction thereof; and
the time stamp extraction unit extracts time stamps stored in the headers of the Internet Protocol packets.

7. A user terminal device for use in a broadcast transport stream distribution system which distributes broadcast transport streams in which transport streams of broadcast program contents are packetized from a distribution apparatus via a communication line through an Internet Protocol network, the device comprising:
a unit that, when the distribution apparatus counts standard clocks to generate time stamps corresponding to a transmission rate of the transport streams adds the time stamps in turn to the packets of the broadcast transport streams, respectively, to generate a partial transport stream, and converting the partial transport stream into Internet Protocol packets to transmit them at a predetermined rate, and
generates reference time stamps equivalent to the time stamps respectively added to the packets of the transport streams by generating and counting reference clocks equivalent to the standard clocks, corrects the reference time stamps based on standard time, extracts in turn time stamps of arbitrary transport stream packets from the Internet Protocol packets to be transmitted, compares the extracted time stamps with the reference time stamps, respectively, and, if any of the extracted time stamps does not coincide with a corresponding one of the reference time stamps, determines a difference between time values indicated by said any extracted time stamp and said corresponding reference time stamp, and calculates a correction value of a transmission rate, which corresponds to the difference between the time values, and controls a transmission rate of the Internet Protocol packets based on the correction value to eliminate the difference value up to a specified number of broadcast transport streams or up to a number of transmitted Internet Protocol packets;

a buffer which temporarily stores the Internet Protocol packets to be transmitted via the communication line;

an Internet Protocol packet processing unit which takes out the Internet Protocol packets from the buffer in turn to extract the partial transport streams; and a broadcast transport stream reproduction unit which reproduces the broadcast transport streams by extracting time stamps from the Internet Protocol packets of the partial transport stream extracted by the Internet Protocol packet processing unit and by re-arranging the Internet Protocol packets on a time axis on the basis of the corresponding-time stamps.

8. A broadcast transport stream distribution method for use in a broadcast transport stream distribution system which distributes broadcast transport streams, in which transport streams of broadcast program contents are packetized, to a user terminal device via a communication line through an Internet Protocol network, the method comprising:

counting standard clocks to generate time stamps corresponding to a transmission rate of the broadcast transport streams;

adding in turn the time stamps to the packets of the broadcast transport streams, respectively, to generate a partial transport stream;

converting the partial transport stream into Internet Protocol packets to transmit them;

generating reference time stamps equivalent to the time stamps respectively added to the broadcast transport streams by generating and counting reference clocks equivalent to the standard clocks;

extracting time stamps of arbitrary transport stream packets from the Internet Protocol packets to be transmitted; and comparing the extracted time stamps with the reference time stamps, determining, if a result of comparison indicates that any of the extracted time stamps does not coincide with a corresponding one of the reference time stamps, a difference between time values indicated by said any extracted time stamp and said corresponding reference time stamp, calculating a correction value of a transmission rate, which corresponds to the difference between the time values, and controlling a transmission rate of the Internet Protocol packets on the basis of the comparison result correction value to eliminate the difference value up to a specified number of broadcast transport streams or up to a number of transmitted Internet Protocol packets.

9. The method according to claim 8, wherein the generating of the partial transport streams outputs a partial transport stream with the time stamps added thereto by taking out NULL packets from the partial transport stream.

10. The method according to claim 8, wherein the transmitting of the Internet Protocol packets stores time stamps to be added to any packet of the partial transport stream in headers of the Internet Protocol packets as they are or after correction of the time stamps; and the extracting of the time stamp extracts the time stamps stored in the headers of the Internet Protocol packets.

* * * * *